United States Patent
Dupre la Tour et al.

(10) Patent No.: US 11,262,216 B2
(45) Date of Patent: Mar. 1, 2022

(54) METHOD FOR ESTIMATING THE POSITION OF A MAGNET COMPRISING A PHASE FOR IDENTIFYING A MAGNETIC DISTURBANCE

(71) Applicant: Advanced Magnetic Interaction, AMI, Seyssinett-Pariset (FR)

(72) Inventors: Jean-Marie Dupre la Tour, Meylan (FR); Tristan Hautson, Fontaine (FR)

(73) Assignee: Advanced Magnetic Interaction, AMI, Seyssinet-Pariset (FR)

( * ) Notice: Subject to any disclaimer, the term of this patent is extended or adjusted under 35 U.S.C. 154(b) by 119 days.

(21) Appl. No.: 16/617,981

(22) PCT Filed: May 29, 2018

(86) PCT No.: PCT/EP2018/063981
§ 371 (c)(1),
(2) Date: Nov. 27, 2019

(87) PCT Pub. No.: WO2018/219889
PCT Pub. Date: Dec. 6, 2018

(65) Prior Publication Data
US 2020/0116524 A1    Apr. 16, 2020

(30) Foreign Application Priority Data
May 31, 2017    (FR) ...................................... 1754806

(51) Int. Cl.
*G01D 5/14*    (2006.01)
*G06F 3/041*    (2006.01)
(Continued)

(52) U.S. Cl.
CPC .............. *G01D 5/14* (2013.01); *G06F 3/046* (2013.01); *G06F 3/0418* (2013.01); *G06F 17/10* (2013.01); *G06F 3/04182* (2019.05)

(58) Field of Classification Search
CPC ..... G01D 5/14; G06F 3/04182; G06F 3/0418; G06F 3/046; G06F 17/10
See application file for complete search history.

(56) References Cited

U.S. PATENT DOCUMENTS

2015/0057969 A1    2/2015    Hautson et al.
2015/0168123 A1    6/2015    Hautson
(Continued)

FOREIGN PATENT DOCUMENTS

EP    2884372 A1    6/2015
FR    3029642 A1    6/2016
(Continued)

OTHER PUBLICATIONS

English machine translation of Houtson (WO 2017/060644 A1) (Year: 2017).*
(Continued)

*Primary Examiner* — Walter L Lindsay, Jr.
*Assistant Examiner* — Geoffrey T Evans
(74) *Attorney, Agent, or Firm* — TraskBritt

(57) ABSTRACT

The present disclosure relates to a method for estimating the position of a magnet using a tracking device comprising an array of magnetometers, the method comprising phases of determining an initial state vector associated with the magnet, of measuring a useful magnetic field, of estimating a magnetic field, of calculating a bias between the measured magnetic field and the estimated magnetic field, and of updating the state vector on the basis of the bias. It also comprises an identifying phase comprising a step of identifying a magnetic disturbance on the basis of an indicator calculated depending on an estimated magnetic field and a measured magnetic field.

9 Claims, 8 Drawing Sheets

(51) Int. Cl.
  *G06F 3/046*  (2006.01)
  *G06F 17/10*  (2006.01)

(56) References Cited

U.S. PATENT DOCUMENTS

| | | | |
|---|---|---|---|
| 2016/0018485 A1 | 1/2016 | Hautson et al. | |
| 2017/0322664 A1* | 11/2017 | Park | B60K 35/00 |
| 2017/0336885 A1 | 11/2017 | Hautson et al. | |
| 2018/0340986 A1* | 11/2018 | Latham | G01R 33/0023 |

FOREIGN PATENT DOCUMENTS

| | | |
|---|---|---|
| WO | 2013144342 A2 | 10/2013 |
| WO | 2014053526 A2 | 4/2014 |
| WO | 2014135421 A1 | 9/2014 |
| WO | 2017060644 A1 | 4/2017 |
| WO | 2018219889 A1 | 12/2018 |

OTHER PUBLICATIONS

International Search Report for International Application PCT/EP2018/063981, dated Sep. 10, 2018, 7 pages (including English translation).
International Written Opinion for International Application PCT/EP2018/063981, dated Sep. 10, 2018, 10 pages (including English translation).
French Preliminary Search Report and Written Opinion for French Application No. FR1754806, dated Mar. 23, 2018, 21 pages (with English Machine Translation).

* cited by examiner

METHOD FOR ESTIMATING THE POSITION OF A MAGNET COMPRISING A PHASE FOR IDENTIFYING A MAGNETIC DISTURBANCE

CROSS-REFERENCE TO RELATED APPLICATIONS

This application is a national phase entry under 35 U.S.C. § 371 of International Patent Application PCT/EP2018/063981, filed May 29, 2018, designating the United States of America and published in French as International Patent Publication WO 2018/219889 A1 on Dec. 6, 2018, which claims the benefit under Article 8 of the Patent Cooperation Treaty to French Patent Application Serial No. 1754806, filed May 31, 2017.

TECHNICAL FIELD

The present disclosure relates to a method for estimating the position of a magnet relative to an array of magnetometers comprising a phase of identification of a magnetic disrupter situated in the vicinity of the array of magnetometers.

BACKGROUND

It is known practice to use at least one magnet in the context of a system for recording the plot of a magnetic pencil on a writing medium. The magnet is, here, an object with which is associated a non-zero magnetic moment, for example, a permanent magnet fixed to a non-magnetic pencil.

As an example, the document WO2014/053526 describes a system for recording the plot of a pencil to which is fixed an annular magnet. The permanent magnet comprises a magnetic material, for example ferromagnetic or ferrimagnetic, uniformly distributed about a mechanical axis that coincides with the longitudinal axis of the pencil.

The recording of the plot of the pencil is ensured by a magnet tracking device that comprises an array of magnetometers, each magnetometer being capable of measuring the magnetic field. A magnet tracking method estimates the position of the magnet at each measurement instant using a recursive estimator of Kalman filter type.

However, a magnetic disrupter may be situated in the vicinity of the magnet tracking device. It is then likely to provoke a degradation of the tracking of the magnet.

BRIEF SUMMARY

The objective of embodiments of the present disclosure is to at least partly remedy the drawbacks of the prior art, and more particularly to propose a method for estimating a position of the magnet, the latter being intended to be moved relative to an array of magnetometers, comprising a phase of identification of a magnetic disrupter. The subject of the present disclosure is a method for estimating the position of the magnet by a tracking device comprising an array of magnetometers capable of measuring a magnetic field, the method being implemented by a processor, comprising the following phases:

determination of a so-called initial state vector associated with the magnet, for an initial measurement instant, the state vector comprising variables representative of the position of the magnet relative to the array of magnetometers;

measurement, by the array of magnetometers, of a so-called useful magnetic field, at a measurement instant, in the presence of the magnet;

estimation of a magnetic field generated by the magnet, as a function of the state vector obtained at a preceding measurement instant, on the basis of a predetermined model expressing a relationship between the magnetic field generated by the magnet and the state vector of the magnet;

calculation of a bias by the difference between the estimated magnetic field and the measured useful magnetic field;

updating of the state vector as a function of the calculated bias, thus making it possible to obtain an estimated position of the magnet at the measurement instant; and reiteration of the measurement, estimation, bias calculation and updating phases, on the basis of the updated state vector, by incrementing the measurement instant.

According to the present disclosure, the method also comprises the following phase:

identification, at at least one measurement instant, of a magnetic disrupter distinct from the magnet and situated in the vicinity of the array of magnetometers, comprising the following steps:

calculation of a so-called indicator parameter from a deviation parameter defined as a function of a difference between a so-called estimated magnetic field generated by the magnet for the state vector obtained at the preceding measurement instant or for the updated state vector, on the basis of the predetermined model, and the useful magnetic field measured at the measurement instant; and comparison of the indicator to a predetermined threshold value, and identification of the magnetic disrupter when at least one of the values of the indicator is greater than or equal to the threshold value.

The identification phase can be performed at each measurement instant or for some of the measurement instants. The preceding measurement instant can be the measurement instant at the preceding increment or, for the first time increment, at the initial measurement instant.

Some preferred but nonlimiting aspects of this method are as follows.

The indicator can be equal to the ratio of the deviation parameter to a denominator term comprising at least the estimated magnetic field of the indicator, the measured useful magnetic field of the indicator, or at least one predetermined constant representative of a bias of at least one of the magnetometers.

The denominator term can comprise the estimated magnetic field of the indicator and the predetermined constant.

The estimation, bias calculation and updating phases can be performed by a Bayesian recursive estimation algorithm.

The estimation phase can comprise:
a step of obtaining of a so-called predicted state vector at the measurement instant as a function of a state vector obtained at a preceding measurement instant, and
a step of calculation of the estimated magnetic field for the predicted state vector, and the bias calculation phase can comprise:
a step of calculation of the bias, called innovation, as the difference between the estimated magnetic field for the predicted state vector and the measured useful magnetic field.

The deviation parameter can be equal to the innovation.
The deviation parameter can be equal to the difference between an estimated magnetic field generated by the magnet for the updated state vector, and the useful magnetic field measured at the measurement instant.

The estimation, bias calculation and updating phases can be performed by an optimization algorithm based on iterative minimization of the bias, called cost function, at the measurement instant.

The state vector can also comprise variables representative of a magnetic moment of the magnet.

The phase of identification of the magnetic disrupter can comprise a step of transmission of a signal to the user prompting separation of the magnetic disrupter from the array of magnetometers, as long as at least one of the values of the indicator is greater than or equal to the predetermined threshold value.

The present disclosure relates also to an information storage medium, comprising instructions for implementing the method according to any one of the preceding features, these instructions being able to be executed by a processor.

BRIEF DESCRIPTION OF THE DRAWINGS

Other aspects, aims, advantages and features of embodiments of the present disclosure will become more apparent on reading the following detailed description of preferred embodiments thereof, given by way of nonlimiting example, and with reference to the attached drawings in which.

DETAILED DESCRIPTION

In the figures and hereinafter in the description, the same references represent identical or similar elements. Furthermore, the different elements are not represented to scale so as to favor clarity of the figures. Moreover, the different embodiments and variants are not mutually exclusive and can be combined with one another. Unless stipulated otherwise, the terms "substantially," "approximately," and "of" the order of mean to within 10%.

The present disclosure relates to a method for estimating the position of a magnet relative to an array of magnetometers of a magnet tracking device, comprising a phase of identification of a magnetic disrupter situated in the vicinity of the array of magnetometers.

The magnet comprises a material exhibiting a magnetization, for example remnant, for which a magnetic moment is defined. The magnet can be a cylindrical permanent magnet, for example annular, as illustrated in the document WO2014/053526 cited previously. It can also be a utensil or a pencil equipped with such a magnet or comprising a different permanent magnet, for example incorporated in the body of the pencil. The term pencil should be understood in the broad sense and can encompass pens, felt pens, brushes or any other writing or drawing member.

The magnetic material is preferably ferrimagnetic or ferromagnetic. It exhibits a non-zero spontaneous magnetic moment even in the absence of an external magnetic field. It can exhibit a coercive magnetic field greater than 100 $A \cdot m^{-1}$ or 500 $A \cdot m^{-1}$ and the intensity of the magnetic moment is preferably greater than 0.01 $A \cdot m^2$, even than 0.1 $A \cdot m^2$. It is considered hereinbelow that the permanent magnet can be approximated by a magnetic dipole, but can be approximated by other models. The magnetic axis of the object is defined as being the axis colinear to the magnetic moment of the object.

Figure 1:
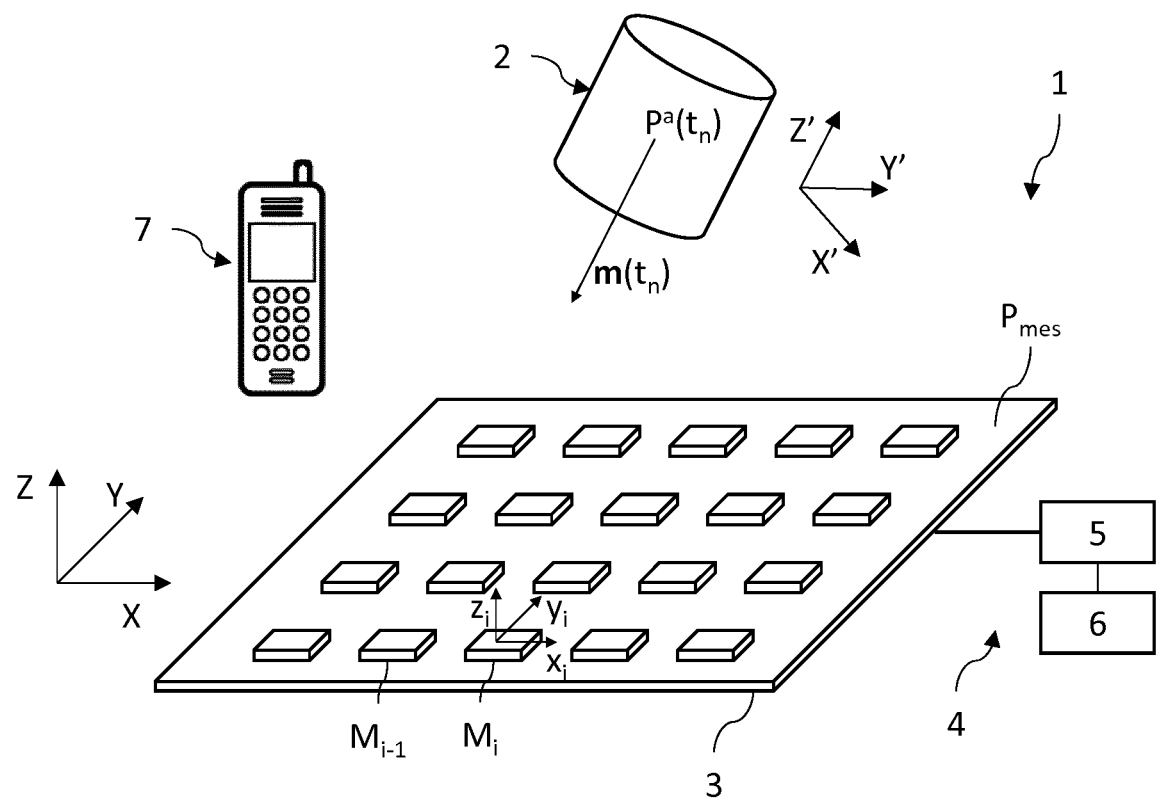
FIG. 1 is a perspective schematic view of a magnet tracking device comprising an array of magnetometers according to an embodiment, in the vicinity of which is situated a magnetic disrupter.

FIG. 1 is a perspective, schematic and partial view of a device 1 for tracking a magnet 2 according to an embodiment. The magnet 2 is, here, a cylindrical permanent magnet, for example annular, that is intended to be fixed to a pencil (not represented).

The device 1 (also referred to herein as a "tracking device") is capable of measuring the magnetic field emitted by the magnet 2, at different measurement instants, during a tracking time T, in a reference frame XYZ, and of estimating the position and the magnetic moment of the magnet 2 on the basis of the measured values of the magnetic field. In other words, the tracking device 1 makes it possible to determine the position and the orientation of the permanent magnet 2 at different instants in the reference frame XYZ. As described later, the tracking device 1 also makes it possible to identify a magnetic disrupter 7, distinct from the magnet 2 to be tracked, situated in the vicinity of the array of magnetometers, that is to say to at least determine the presence thereof in the vicinity of the array of magnetometers.

Here and for the rest of the description, a three-dimensional direct reference frame (X,Y,Z) is defined in which the axes X and Y form a plane parallel to the measurement plane of the array of magnetometers, and in which the axis Z is oriented substantially orthogonally to the measurement plane. Hereinafter in the description, the terms "vertical" and "vertically" extend as being relative to an orientation substantially parallel to the axis Z, and the terms "horizontal" and "horizontally" as being relative to an orientation substantially parallel to the plane (X,Y). Moreover, the terms "lower" and "upper" extend as being relative to an increasing positioning when moving away from the measurement plane in the +Z direction.

The position $P_a$ of the magnet 2 corresponds to the coordinates of the geometrical center of the magnet 2, that is to say to the unweighted barycenter of the set of the points of the magnet 2. Thus, the magnetic moment m of the magnet exhibits the components ($m_x$, $m_y$, $m_z$) in the reference frame XYZ. Its norm, also called intensity or amplitude, is denoted $\|m\|$ or m.

The tracking device 1 comprises an array of magnetometers n, distributed with respect to one another so as to form a measurement plane $P_{mes}$. The number of magnetometers $M_i$ can be, for example, greater than or equal to two, preferably greater than or equal to sixteen, for example equal to thirty-two, notably when it concerns triaxial magnetometers. The array of magnetometers does however comprise at least three measurement axes at a distance from one another and not pairwise parallel.

Magnetometers n are fixed to a protection plate 3 and can be situated on the rear face of the plate, the latter being produced in a non-magnetic material. "Fixed" is understood to mean that they are joined to the plate with no degree of freedom. They are, here, aligned in rows and columns, but can be positioned mutually substantially randomly. The distances between each magnetometer and its neighbors, and, in particular, the relative positions of the magnetometers, are known and constant in time. For example, they can be between 1 cm and 4 cm.

The magnetometers NI each have at least one measurement axis, for example three axes, denoted $x_i$, $y_i$, $z_i$. Each magnetometer therefore measures the amplitude and the direction of the magnetic field B disturbed by the permanent magnet. More specifically, each magnetometer NI measures the norm of the orthogonal projection of the magnetic field B on the axes $x_i$, $y_i$, $z_i$ of the magnetometer. A calibration parameter of the magnetometers NI can be the noise associated with the magnetometers, here of the order of 0.4 µT. Disturbed magnetic field B is understood to mean the ambient magnetic field $B^{amb}$, that is to say not disturbed by the magnet, to which is added the magnetic field $B^a$ generated by the magnet. Other magnetic components can be added, such as a component associated with the noise of the sensors, as well as a component linked to the presence of a magnetic disrupter.

The tracking device 1 also comprises a computation unit 4 capable of calculating the position of the magnet 2 and its magnetic moment in the reference frame XYZ from the measurements of the magnetometers M. Furthermore, as described later, the computation unit 4 is capable of identifying a magnetic disrupter 7 situated in the vicinity of the array of magnetometers.

For that, each magnetometer NI is electrically connected to the computation unit 4 by an information transmission bus (not represented). The computation unit 4 comprises a programmable processor 5 capable of executing instructions stored on an information storage medium. It also comprises a memory 6 containing the instructions necessary for the implementation of the method for tracking the magnet 2 and of a phase of identification of the magnetic disrupter 7 by the processor 5. The memory 6 is also suitable for storing the information calculated at each measurement instant.

The computation unit 4 implements a mathematical model associating the position of the permanent magnet in the reference frame XYZ, as well as the orientation and the intensity of the magnetic moment, with the measurements of the magnetometers M. This mathematical model is constructed from the equations of electromagnetism, in particular of magnetostatics, and is parameterized in particular by the positions and orientations of the magnetometers in the reference frame XYZ. Here, this model is nonlinear. The computation unit implements an algorithm for estimation of its solution such as, for example, a Bayesian filtering or an optimization, even any other algorithm of the same type.

Preferably, to be able to approximate the permanent magnet to a magnetic dipole, the distance between the permanent magnet and each magnetometer n is greater than two times, even three times, the greatest dimension of the permanent magnet. This dimension can be less than 20 cm, even less than 10 cm, even less than 5 cm. The magnet can be modeled by a dipole model, among other things, as a function in particular of the distance between the magnet to be tracked and the array of magnetometers.

Figure 2:
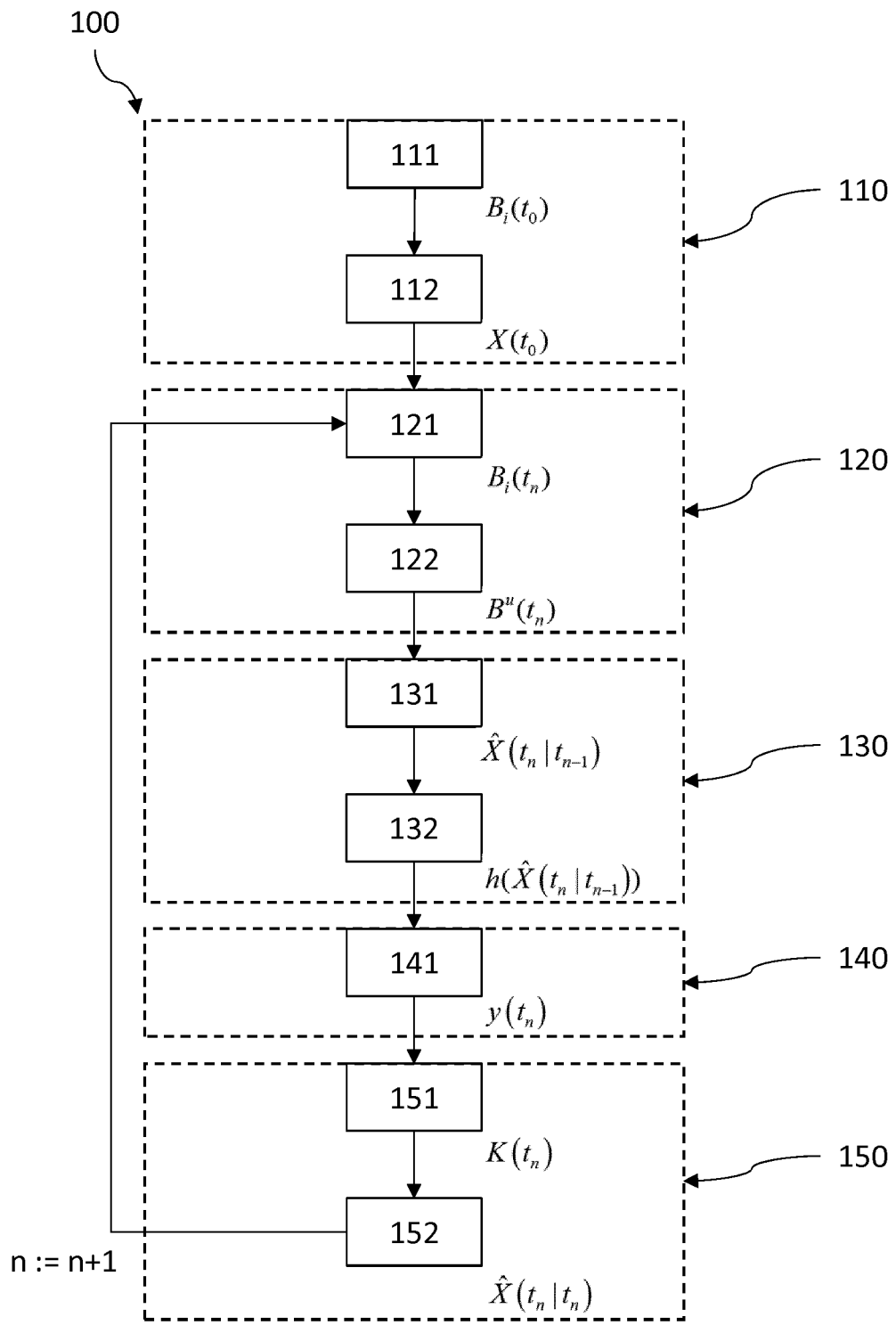
FIG. 2 is a flow diagram of an example of a method of estimating a position of the magnet.

FIG. 2 is a flow diagram of an example of a method 100 for estimating a position of the magnet performed by the tracking device, during which the magnet is moved relative to the array of magnetometers in the reference frame XYZ, here according to a first embodiment, in which the estimation algorithm implemented is a Bayesian filtering. In this example, the Bayesian filtering is a Kalman filter, such as an extended Kalman filter.

The method for estimating the position, also called tracking method, comprises an initialization phase 110. This phase comprises the measurement (step 111) of the magnetic field generated by the magnet and the initialization (step 112) of a state vector X associated with the magnet, for a reference instant $t_0$.

For that, in a first step 111, at a reference instant $t_0$, the magnetic field $B_i(t_0)$ is measured by each magnetometer n of the array. In this step, the permanent magnet may not be present, therefore not detectable by the array of magnetometers, so that the measured magnetic field $B_i(t_0)$ measured by the magnetometer $M_i$ comprises the following components:

$$B_i(t_0) = B_i^{amb} + B_i^n(t_0) + B_i^a(t_0)$$
$$= B_i^{amb} + B_i^b(t_0)$$

in which $B_i^{amb}$ is a component associated with the Earth's magnetic field, in which $B_i^n$ is a component associated with the noise of the environment and of the sensors which, in the absence of a magnetic disrupter in the vicinity of the tracking device, corresponds essentially to a component $B_i^b$ associated with the noise of the corresponding magnetometer $M_i$, and in which $B_i^a$ is a magnetic field component, here zero, generated by the magnet and measured by the magnetometer $M_i$.

The magnetic disrupter is a stray object different from the magnet to be tracked, this object being likely to emit an interfering magnetic field $B^p$ and/or to lead to the formation of an induced magnetic field $H^{p,i}.B^a$ induced by interaction with the magnetic field $B^a$ of the magnet 2 to be tracked.

In a step 112, a state vector $\hat{X}(t_0)$ is assigned to the permanent magnet, at the reference instant $t_0$. The state vector is formed by variables representative of the position (x,y,z) and of the magnetic moment $(m_x,m_y,m_z)$ of the magnet 2 in the reference frame XYZ. The position of the magnet and the coordinates of the magnetic moment can be defined arbitrarily or can correspond to predetermined values.

The following steps are performed iteratively at an incremented measurement instant $t_n$, the time being discretized at a determined sampling frequency, for example, 140 Hz. Each iteration of rank n has an associated measurement instant $t_n$, also called current instant.

The tracking method then comprises a measurement phase 120. This phase comprises the measurement of the magnetic field by the array of magnetometers at the measurement instant $t_n$ and the calculation of the so-called useful magnetic field $B^u$ generated by the magnet 2.

In a step 121, at the measurement instant $t_n$, the magnetic field $B_i(t_n)$ is measured by each magnetometer $M_i$ of the array. In this step, the permanent magnet is detectable by the array, such that the magnetic field $B_i(t)$ measured by each magnetometer $M_i$ comprises the following components:

$$B_i(t_n) = B_i^{amb} + B_i^n(t_n) + B_i^a(t_n)$$
$$= B_i^{amb} + B_i^b(t_n) + B_i^a(t_n)$$

in which there is once again the magnetic field $B^a$ generated by the permanent magnet at the current instant t, the noise associated with the sensors $B^b$ and the ambient field $B^{amb}$.

In a step 122, the so-called useful magnetic field $B^u$ is calculated from the measurements of the magnetic field $B_i(t_0)$ and $B_i(t_n)$. It corresponds here to a vector whose dimensions depend on the number of magnetometers and on the number of measurement values effected by each magnetometer. More specifically, the useful magnetic field $B^u$ is obtained by subtraction of the magnetic field $B(t_0)$ measured at the reference instant $t_0$ from the magnetic field $B(t_n)$ measured at the measurement instant $t_n$:

$$B_i^u(t_n) = B_i(t_n) - B_i(t_0)$$
$$= B_i^a(t_n) - B_i^a(t_0) = B_i^a(t_n)$$

in which the temporal difference of the terrestrial component $B^{amb}$ between to and $t_n$ can be disregarded, just like that of the component $B^b$ linked to the noise of the magnetometers. There thus remains, essentially, in addition, if appropriate, to the terms linked to a calibration fault and/or to an offset deriving from a possible magnetization of the magnetometers, the component $B^a$ of the magnetic field generated by the magnet at the current instant $t_n$.

The tracking method then comprises a phase 130 of estimation of a magnetic field generated by the magnet as a function of a state vector obtained at a preceding measurement instant.

In a step 131, a so-called predicted state vector $\hat{X}(t_n|t_{n-1})$ associated with the magnet is predicted, from the estimated state $\hat{X}(t_{n-1}|t_{n-1})$ at the preceding instant $t_{n-1}$ or from the estimated state $\hat{X}(t_0)$ at the initial instant of the phase 110. The predicted state of the magnet can be calculated from the following relationship:

$$\hat{X}(t_n|t_{n-1}) = F(t_n) \cdot \hat{X}(t_{n-1}|t_{n-1}) = \hat{X}(t_{n-1}|t_{n-1})$$

in which $F(t_n)$ is a prediction matrix that links the preceding estimated state $\hat{X}(t_{n-1}|t_{n-1})$ to the current predicted state $\hat{X}(t_n|t_{n-1})$. In this example, the prediction matrix F is the identity matrix, but other formulations are possible. Thus, as a variant, the prediction function can take account of one or more preceding states, and possibly an estimation of kinematic parameters relating to a movement and/or to a rotation of the magnet during preceding measurement instants.

In this same step 131, the a priori estimation matrix $P(t_n|t_{n-1})$ of the covalence of the error, which corresponds to the measurement of the accuracy of the current predicted state $\hat{X}(t_n|t_{n-1})$, is also calculated from the following relationship:

$$P(t_n|t_{n-1}) = F(t_n) \cdot P(t_{n-1}|t_{n-1}) \cdot F^T(t_n) + Q(t_n) = P(t_{n-1}|t_{n-1}) + Q(t_n)$$

in which $F(t_n)$ is, here, the identity matrix, $Q(t_n)$ is the covariance matrix of the noise of the process, $^T$ is the transposition operator, and $P(t_{n-1}|t_{n-1})$ is the covariance matrix of the error, which derives from the preceding instant $t_{n-1}$. In the first iteration at n=1, the matrix $P(t_{n-1}|t_{n-1})$ can be initialized by a diagonal matrix.

In a step 132, the so-called estimated magnetic field, generated by the magnet, is calculated as a function of the predicted state vector $\hat{X}(t_n|t_{n-1})$, at the current instant $t_n$, from a so-called observation function h, also called measurement function. The observation function h is based on a physical model constructed from the equations of electromagnetism, which associates an estimated magnetic field with the estimated values of the position (x,y,z) and of the magnetic moment $(m_x,m_y,m_z)$ of the magnet. Thus, the term can be expressed according to the following relationship:

$$h(\hat{X}(t_n|t_{n-1})) = \hat{B}^a(t_n) + \varepsilon^m$$

in which $\hat{B}^a$ is the component representative of the estimated magnetic field of the magnet at the current instant $t_n$, and $\varepsilon^m$ is a component associated with errors of the physical model h.

The tracking method then comprises a phase 140 of calculation of a bias. In a step 141, the bias at the current instant $t_n$, here the innovation $y(t_n)$, is calculated by the difference between the estimated magnetic field $h(\hat{X}(t_n|t_{n-1}))$ at the current instant $t_n$, and the measured useful magnetic field $B_i^u(t_n)$ at the current instant $t_n$:

$$y(t_n) = B^u(t_n) - h(\hat{X}(t_n|t_{n-1}))$$
$$= B^a(t_n) - (\hat{B}^a(t_n) + \varepsilon^m)$$
$$= -\varepsilon^m$$

which is then essentially equal, sign apart, to the errors $\varepsilon^m$ of the physical model, in as much as the measured magnetic field of the magnet $B^a$ corresponds substantially to its estimation obtained in the step 132.

The tracking method then comprises a phase 150 of calculation of the estimated position of the magnet at the current instant $t_n$. This phase consists in updating the current state vector $\hat{X}(t_n|t_n)$ of the magnet by correcting the state vector previously obtained, namely, here, the current predicted state $\hat{X}(t_n|t_{n-1})$, as a function of the calculated bias $y(t_n)$.

In a step 151, a term called Kalman gain $K(t_n)$ at the current instant $t_n$ is calculated from the following relationship:

$$K(t_n) = P(t_n|t_{n-1}) \cdot H^T(t_n) \cdot S(t_n)^{-1}$$

in which the estimation matrix $P(t_n|t_{n-1})$ is obtained in the step 131, H is the observation matrix, defined here as being the jacobian $$H = \frac{\partial h}{\partial X_u}$$

of the observation function h, with u the index of the variables of the state vector, and S is the covariance of the innovation, defined as being equal to $H(t_n) \cdot P(t_n|t_{n-1}) \cdot H^T(t_n) + R(t_n)$ in which R is the covariance matrix of the measurement and is therefore representative of the noise of the sensors.

In a step 152, the estimation of the state vector $\hat{X}$ at the measurement instant $t_n$ is performed by updating the current predicted state $\hat{X}(t_n|t_{n-1})$ from the product of the innovation term $y(t_n)$ and of the Kalman gain $K(t_n)$, as expressed by the following relationship:

$$\hat{X}(t_n|t_n) = \hat{X}(t_n|t_{n-1}) + y(t_n) \cdot K(t_n)$$

The updating of the covariance matrix of the error is also performed by the following relationship:

$$P(t_n|t_n) = (I - K(t_n) \cdot H(t_n)) \cdot P(t_n|t_{n-1})$$

in which I is the identity matrix.

The estimated position at the measurement instant $t_n$ is thus obtained from the variables of the estimated state vector $\hat{X}$ relating to the position (x,y,z) of the magnet in the reference frame XYZ. The time is then incremented by a supplementary increment, and the method reiterates the steps previously described at the next current instant $t_{n+1}$, here from the measurement phase 120. The tracking of the magnet in the reference frame XYZ is thus performed.

In the context of a Bayesian filter such as the Kalman filter, which comprises a prediction phase and an updating phase, the prediction is performed in the step 131, and the updating is performed by the steps 132, 141, 151 and 152.

However, the inventors have demonstrated that the presence of a magnetic disrupter in the vicinity of the tracking device can lead to an increase in the uncertainty associated with the estimated position of the magnet in the reference frame XYZ and even hamper the convergence of the algorithm for estimating the position of the magnet.

Indeed, in the presence of a magnetic disrupter, the magnetic field $B(t_n)$ measured at the measurement instant $t_n$ becomes, for each sensor of rank i:

$$B_i(t_n) = B_i^{amb} + B_i^n(t_n) + B_i^a(t_n)$$
$$= B_i^{amb} + [B_i^p(t_n) + H_i^{p,i}(t_n) \cdot B_i^a(t_n) + B_i^b(t_n)] + B_i^a(t_n)$$

in which the component $B^n$ now comprises a supplementary term $B^p$ corresponding to the permanent magnetic field generated by the magnetic disrupter, and possibly a term $H^{p,i} \cdot B^a$ corresponding to the induced magnetic field derived from a magnetic interaction between the disrupter and the magnet.

The useful magnetic field $B^u(t_n)$ calculated at the current instant $t_n$ becomes, for each sensor of rank i:

$$B_i^u(t_n) = B_i(t_n) - B_i(t_0)$$
$$= \Delta B_i^n(t_n) + B_i^a(t_n)$$
$$= [B_i^p(t_n) + H_i^{p,i}(t_n) \cdot B_i^a(t_n)] + B_i^a(t_n)$$

which thus comprises, in addition to the term $B^a$ of the magnetic field generated by the magnet, a term associated with the magnetic disrupter (the terms associated with the calibration faults and/or with the magnetization offset are not detailed here).

Also, the innovation term y(t now becomes:

$$y(t_n) = B^u(t_n) - h(\hat{X}(t_n \mid t_{n-1}))$$
$$= [B_i^p(t_n) + H_i^{p,i}(t_n) \cdot B_i^a(t_n)] - \varepsilon^m$$

in which the noise term associated with the presence of the magnetic disrupter is added to the term linked to the errors of the physical model $\varepsilon^m$.

It is then understood that the recursive estimator, which tends to minimize the innovation term y, notably through the jacobian bias $H(t_n)$, and therefore to minimize the errors of the physical model $\varepsilon^m$ in the absence of a magnetic disrupter, can be disturbed by the presence of the term linked to the magnetic disrupter. An increase in the relative error linked to the estimated position of the magnet is then possible, and even a difficulty in the algorithm to be converged.

By way of example, the presence of a portable telephone in the vicinity of the array of magnetometers can provoke such disturbances. The portable telephone, when it is sufficiently close to the array of magnetometers, is then qualified as magnetic disrupter. More generally, it can be, for example, any ferromagnetic material other than the magnet to be tracked, such as parts of a table, of an audio headset, of an electronic device, etc.

Figure 3:
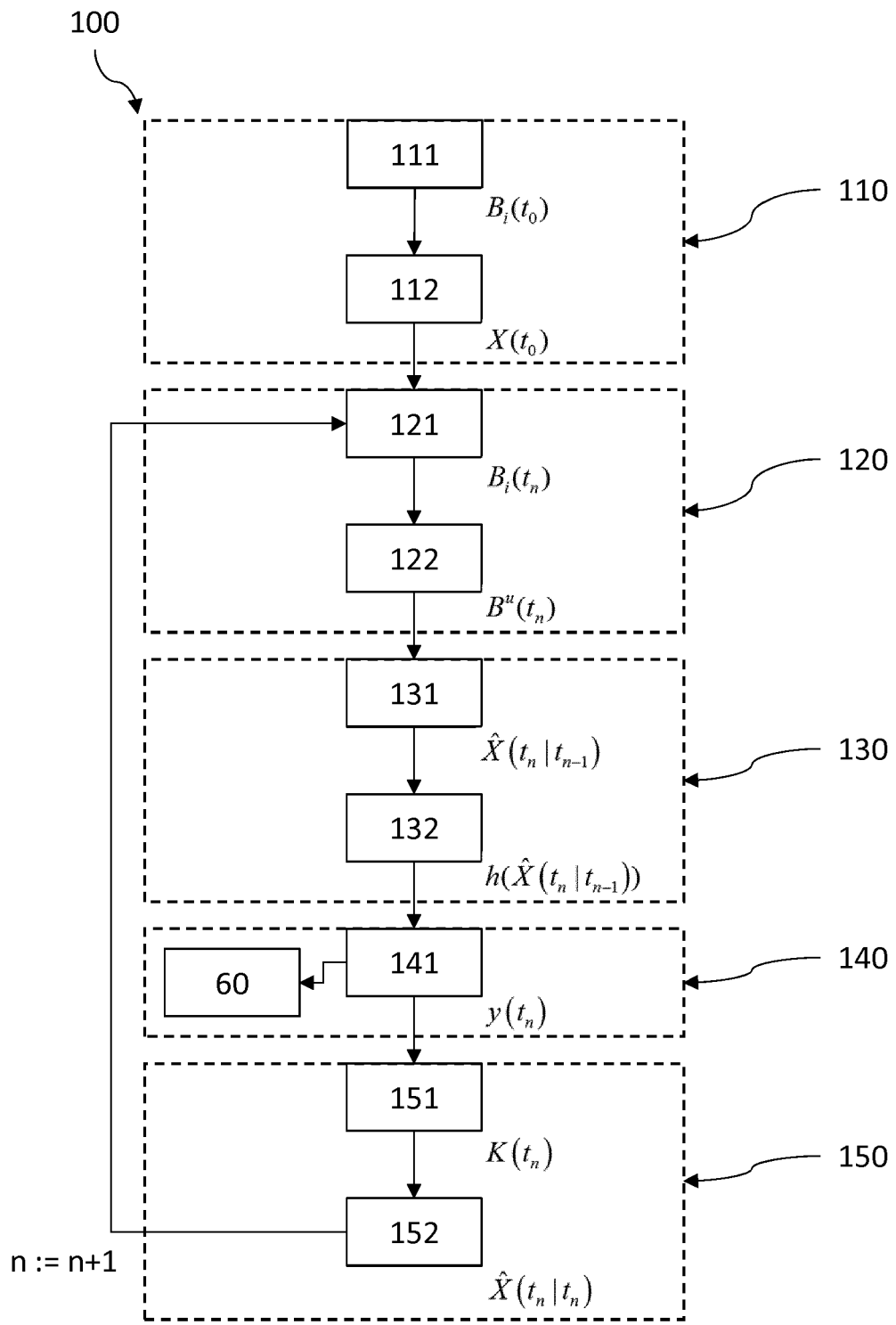
FIG. 3 is a flow diagram of a method for estimating a position of the magnet according to a first embodiment in which the estimator is a Bayesian filter, comprising a phase of identification of the magnetic disrupter.

FIG. 3 is a flow diagram of a method for estimating a position of the magnet according to the first embodiment, that is to say that the position of the magnet is here estimated using a Bayesian filter such as a Kalman filter, for example extended. The method comprises a phase 60 of identification of a magnetic disrupter situated in the vicinity of the array of magnetometers.

The identification phase 60 makes it possible to determine the possible presence of a magnetic disrupter, in order, for example, to indicate to the user to separate the disrupter from the array of magnetometers, even to identify magnetometers situated in proximity to the disrupter not to be taken into account in the estimation of the position of the magnet, to thus perform the tracking of the magnet with the required accuracy and/or by minimizing the risks of estimation algorithm convergence fault.

Thus, the method 100 for tracking the magnet comprises the initialization phase 110, the measurement phase 120, the estimation phase 130, the bias calculation phase 140, and the updating phase 150. These steps are identical or similar to those detailed previously and are not therefore described again.

The method 100 does however include a supplementary phase 60, making it possible to identify the possible presence of a magnetic disrupter in the vicinity of the array of magnetometers.

Figure 4:
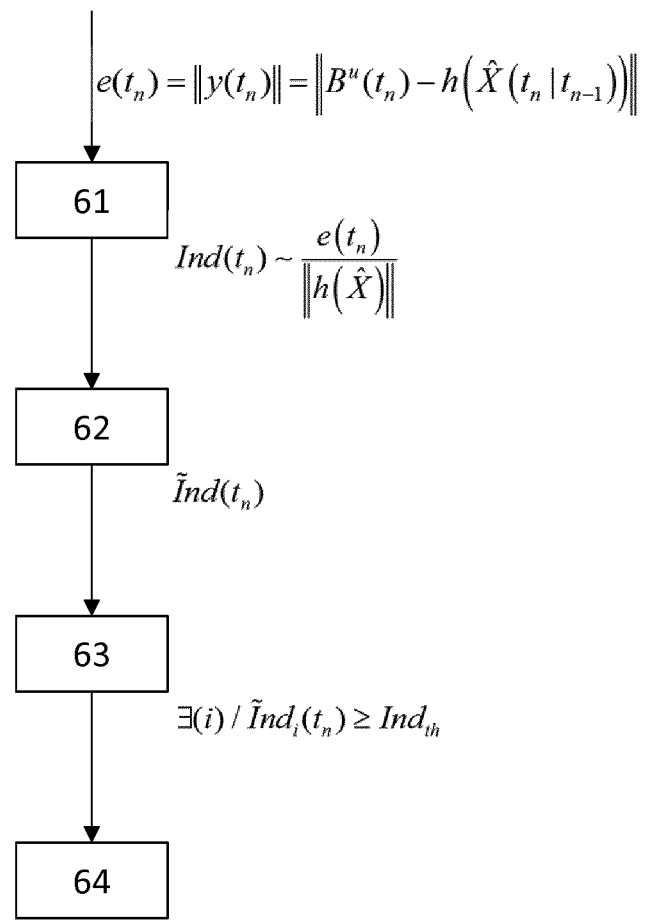
FIG. 4 is a flow diagram illustrating an example of a phase of identification of the magnetic disrupter.

FIG. 4 is a flow diagram that illustrates an example of phase 60 of identification of the magnetic disrupter.

In a step 61, a term called indicator Ind at the current instant $t_n$ is calculated from a deviation parameter $e(t_n)$ defined as a function of a difference between an estimation of the magnetic field generated by the magnet as a function of a state vector obtained at a preceding measurement instant or updated on the basis of the predetermined model h, with respect to the useful magnetic field measured at the measurement instant. Preferably, the indicator is, here, equal to the ratio between the deviation parameter $e(t_n)$ to an estimation of the estimated magnetic field $h(\hat{X})$. In this example, the deviation parameter $e(t_n)$ is equal to the norm 2 of the innovation $y(t_n)$ obtained in the step 141, and the estimated magnetic field $h(\hat{X}(t_n \mid t_{n-1}))$ is, here, that corresponding to the predicted state vector $\hat{X}(t_n \mid t_{n-1})$. Thus, the values of the indicator $Ind(t_n)$ can be calculated, for each sensor of rank i, from the following relationship:

$$Ind_i(t_n) = \frac{e_i(t_n)}{\|h_i(\hat{X})\|} = \frac{\|y_i(t_n)\|}{\|h_i(\hat{X}(t_n \mid t_{n-1}))\|}$$
$$= \frac{\|B_i^u(t_n) - h_i(\hat{X}(t_n \mid t_{n-1}))\|}{\|h_i(\hat{X}(t_n \mid t_{n-1}))\|}$$
$$= \frac{\|(B_i^p(t_n) + H_i^{p,i}(t_n) \cdot B_i^a(t_n)) - \varepsilon^m\|}{\|\hat{B}^a(t_n) + \varepsilon^m\|}$$

In other words, the indicator term $Ind(t_n)$ is, here, equal to the norm 2 of the innovation term $y(t_n)$ divided here by the norm 2 of the estimation term $h(\hat{X}(t_n \mid t_{n-1}))$ of the magnetic field generated by the magnet, obtained in the step 132. Thus, it emerges that the magnetic contribution associated with the disrupter (term situated on the numerator) is divided by the magnetic contribution associated with the magnet (termed situated on the denominator). The indicator term thus represents the force of the magnetic disturbance. As a variant, the values of the indicator term $Ind_i(t_n)$ can be calculated for each measurement axis of the sensors, by adapting, if necessary, the norm used. The ratio between the deviation term $e(t_n)$ and the estimation term $h(\hat{X})$ can therefore be a term by term division, even a division of the norms. Thus, the indicator term can be a vectoral term or a scalar.

The step 62 illustrates an optional but advantageous step of filtering of the indicator calculated in the step 61, for limiting the effect of a possibly significant dynamic of the magnet in terms of movement and/or of rotation. It thus involves a low-pass filtering in which the time constant is a function of the rate of movement and/or of rotation. The indicator is thus filtered as expressed in the following relationship:

$$\tilde{Ind}(t) = (1-\alpha(t_n)) \cdot Ind(t_n) + \alpha(t_n) \cdot \tilde{Ind}(t_{n-1})$$

in which $Ind(t_n)$ is the indicator calculated in the step 61 at the current instant $t_n$ and $\tilde{Ind}(t_{n-1})$ is the indicator calculated at a preceding current instant $t_{n-1}$, and in which $\alpha(t_n)$ is a filtering term less than one, with constant value or calculated at the current instant $t_n$.

This filtering term can be defined from the following relationship:

$$\alpha(t_n) = a + b \cdot (V(t_n))^{-1};$$

$$V(t_n) = \frac{\left\| \hat{X}(t_{n-1} \mid t_{n-1}) - \hat{X}(t_{n-2} \mid t_{n-2}) \right\|}{\Delta t}$$

in which a and b are predetermined scalars, and in which $V(t_n)$ is a kinematic term expressing the dynamics of the magnet in terms of movement and/or of rotation. The kinematic term is thus defined as the difference between the state vectors at two successive measurement instants divided by the time increment.

Thus, the filter indicator $\tilde{Ind}(t_n)$ makes it possible to limit, in the innovation term, the part linked to the kinematics of the magnet between two measurement instants. This part can become significant when the characteristic time of the dynamics of the magnet becomes equal to, even greater than, the sampling time.

In a step 63, the indicator $Ind(t_n)$, here the filtered indicator $\tilde{Ind}(t_n)$, is compared to a predetermined threshold value $Ind_{th}$. And, when it is greater than it, the disrupter is then identified as being present. In the case where the indicator $Ind(t_n)$ is a vectoral quantity, each value of the indicator is compared to the threshold value and the disrupter is identified when at least one value $\tilde{Ind}_i(t_n)$ is equal to, even greater than, the threshold value $Ind_{th}$. As an example, the threshold value can be equal to approximately 14%. Similarly, when the indicator term is a scalar, the latter is compared to the threshold value $Ind_{th}$.

In a step 64, a signal can be transmitted to the user, to prompt moving the disrupter until each value $\tilde{Ind}_i$, at a next measurement instant $t > t_n$, becomes less than the threshold value. The signal can be information displayed on a display screen representing the array of magnetometers. The displayed information can also represent as a so-called heat map in which an intensity scalar is assigned to each magnetometer $M_i$, the intensity scalar corresponds to a value $\tilde{Ind}_i$ of the indicator. Advantageously, the values of the indicator $Ind(t_n)$ are weighted by a weighting factor, even simply clipped so that the values of the indicator are staged between a minimum value, for example 0, and a maximum value, for example 255, and the strong initial values are attenuated in favor of the weak initial values. Thus, the values of the weighted indicator reveal the weak magnetic disturbances. In the case where the indicator $Ind$ does not revert to a value less than the threshold value from a predetermined delay, the initialization phase 110 can be performed.

Thus, the magnet tracking method 100 comprises a phase 60 making it possible to simple identify a magnetic disrupter situated in the vicinity of the array of magnetometers. Indeed, the indicator term $Ind(t_n)$ uses, in this example, the information relating to the magnetic disrupter already contained in the innovation term. Having to use a device and a method that are specific and dedicated to the identification of the magnetic disrupter is thus avoided.

Furthermore, by calculating the indicator term $Ind(t_n)$ from a ratio of the deviation term $e(t_n)$ (here the norm of the innovation) to the estimation term $h(\hat{X})$, it is possible simply to differentiate the component $B_i^p(t_n) + H_i^{p,i}(t_n) \cdot B_i^a(t_n)$ associated with the magnetic disrupter, with respect to the component $\varepsilon^m$ associated with the errors of the physical model. Indeed, without this definition of the indicator as ratio of the deviation term to the estimation term, it can be difficult to differentiate the components associated with the disrupter and with the errors of the model. Indeed, the component $\varepsilon^m$ exhibits an intensity that can change in $1/d_i^k$, while k increases when $d_i$ decreases, $d_i$ being the distance separating the magnet from the magnetometer $M_i$, this intensity being able to increase when the magnet is very close to the magnetometer $M_i$ considered, and thus to become predominant over the component associated with the magnetic disrupter. In other words, the definition of the indicator term $Ind(t_n)$ as ratio of the deviation term $e(t_n)$ to the estimation term $h(\hat{X})$ makes it possible to clearly reveal the component associated with the magnetic disrupter.

It appears also that the indicator $Ind(t_n)$ is, in a certain way, a signal-to-noise ratio (SNR) in as much as the useful signal is, here, the estimated magnetic field $h(\hat{X})$ and the noise associated with the presence of the magnetic disrupter is introduced by the deviation between the measured magnetic field $B^u$ and the estimation term $h(\hat{X})$.

Moreover, the identification phase 60 remains operational whether the magnetic disrupter is present or not in the initialization phase 110. Indeed, in the case where the magnetic disrupter is present at to and remains stationary in the plane XYZ of the array of magnetometers, the measured useful field $B^u(t_n)$ comprises a substantially zero temporal differentiation term $\Delta B_i^p = B_i^p(t_n) - B_i^p(t_0)$, whereas the induced term $H_i^{p,i}(t_n) \cdot B_i^a(t_n)$ remains non-zero. In the case where the magnetic disrupter is present at to but not stationary (because of a relative displacement of the disrupter with respect to the array of magnetometers), the temporal differential term $\Delta B_i^p$ is non-zero. Finally, when the magnetic disrupter is initially absent from the vicinity of the array of magnetometers at to but then becomes present, the temporal differential term $\Delta B_i^p$ as well as the induced term $H_i^{p,i}(t_n) \cdot B_i^a(t_n)$ appear and take a non-zero value.

Advantageously, the indicator $Ind(t_n)$ can comprise, on the denominator, a predetermined constant c representative of a bias of at least one magnetometer, for example a value representative of the sensor noise, for example of the order of 0.3 µT, even a value representative of a detection threshold, for example of the order of 10 µT. This predetermined value can also be representative of a calibration fault or of a measurement error linked to a magnetization of at least one magnetometer. Thus, the indicator $\text{Ind}(t_n)$ can be written, here for each sensor i:

$$Ind_i(t_n) = \frac{e_i(t_n)}{\|h_i(\hat{X})\| + c}$$

Thus, the reliability of the values of the indicator is increased in as much as the indicator is prevented from having excessively high values, notably when the estimated magnetic field by the magnet is weak or even nil. Moreover, not only the errors of the physical model used, but also the bias that the magnetometers can exhibit are eliminated.

As a variant, the indicator $\text{Ind}(t_n)$ can be written as the ratio of the deviation parameter $e(t_n)$ to the predetermined constant c representative of the bias of at least one magnetometer. Thus, the measurement errors associated with the bias of the sensors, these errors being having in the term $B^u$ present in the deviation parameter $e(t_n)$ and in the predetermined constant c, are eliminated. The indicator $\text{Ind}(t_n)$ can thus be written, here for each sensor:

$$Ind_i(t_n) = \frac{e_i(t_n)}{c}$$

As a variant, the indicator $\text{Ind}(t_n)$ can be written as the ratio of the deviation parameter $e(t_n)$ to the measured magnetic field $B^u(t_n)$, with or without the predetermined constant c on the denominator. Thus, an indicator is obtained whose values vary as a function of the intensity of the signal associated with the magnetic disrupter with respect to the intensity of the estimated magnetic field generated by the magnet. The indicator $\text{Ind}(t_n)$ can thus be written, here for each sensor:

$$Ind_i(t_n) = \frac{e_i(t_n)}{\|B_i^u(t_n)\|}$$

Figure 5A:
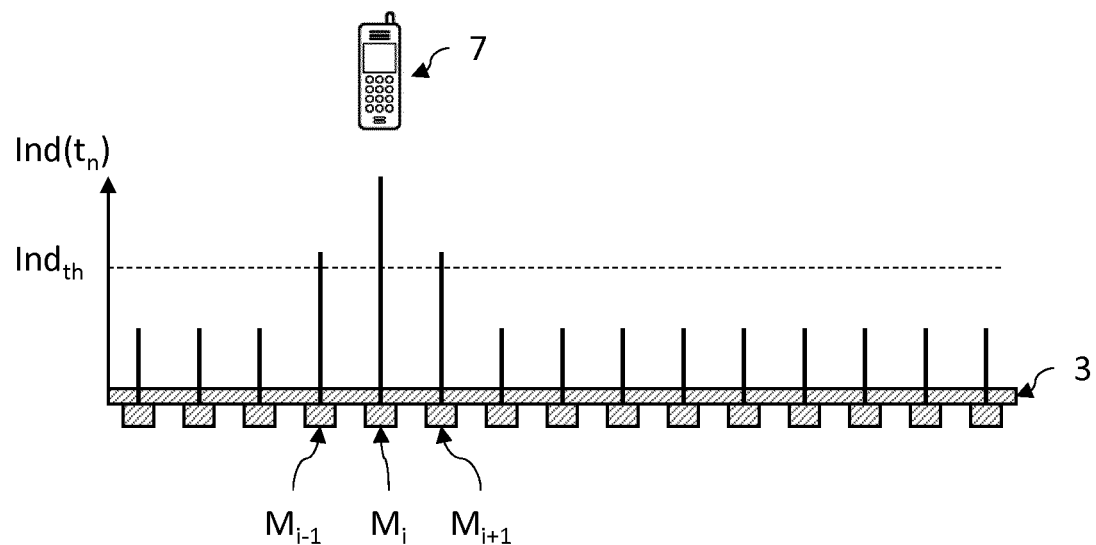
FIGS. 5A and 5B are schematic views in cross section (FIG. 5A) and from above (FIG. 5B) of an array of magnetometers in the vicinity of which is situated a magnetic disrupter.
Figure 5B:
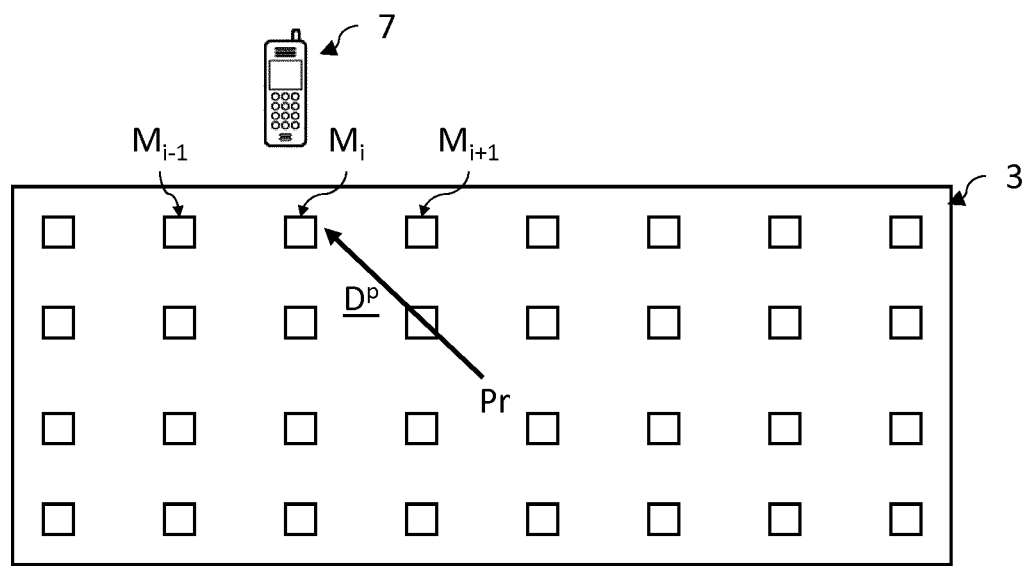

FIGS. 5A and 5B illustrate views in cross section (FIG. 5A) and from above (FIG. 5B) of an example of an array of magnetometers in the vicinity of which is situated a magnetic disrupter.

FIG. 5A illustrates an example of distribution of the disturbance intensity values $\tilde{\text{Ind}}_i$, for each magnetometer $M_i$. For the magnetometers $M_{i-1}$, $M_i$ and $M_{i+1}$ in the vicinity of which the magnetic disrupter is situated, the values of the indicator exceed the threshold value $\text{Ind}_{th}$ so that the magnetic disrupter is correctly identified and located. For the other magnetometers, the corresponding values of the indicator are less than the threshold value.

As illustrated in FIG. 5B, from the indicator represented in the form of a heat map, a direction vector $D^p$ associated with the magnetic disrupter can be calculated and displayed. The direction vector $D^p$ can be obtained from the average of the positions of the magnetometers each weighted by the corresponding disturbance intensity scalar, and from the position of the center Pr of the array of magnetometers. Thus, the user receives information indicating the direction in which the disrupter is situated relative to the array of magnetometers. He or she can then proceed to remove the disrupter from the vicinity of the magnetometers.

The method 100 ensures the tracking of the magnet, and therefore reiterates the phase 120 of measurement, the phase 130 of estimation of the magnetic field generated, the phase 140 of calculation bias (here the innovation), and the phase 150 of calculation of the estimated position of the magnet. Each time the measurement time is incremented, the phase 60 of identification of the magnetic disrupter is performed.

In the case where the magnetic disrupter is still present in the vicinity of the array of magnetometers, the phase 150 of calculation of the estimated position of the magnet can be performed without taking into consideration the measurement values from the magnetometers $M_{i-1}$, $M_i$ and $M_{i+1}$, for which the indicator exhibits local values greater than the threshold value.

A tracking validation step can then be carried out, by comparing, for example, the norm or each component of the magnetic moment, even of the position derived from the state vector $\hat{X}(t_n|t_n)$ estimated in the step 152, to a predetermined reference value of the type of magnet used.

Figure 6A:
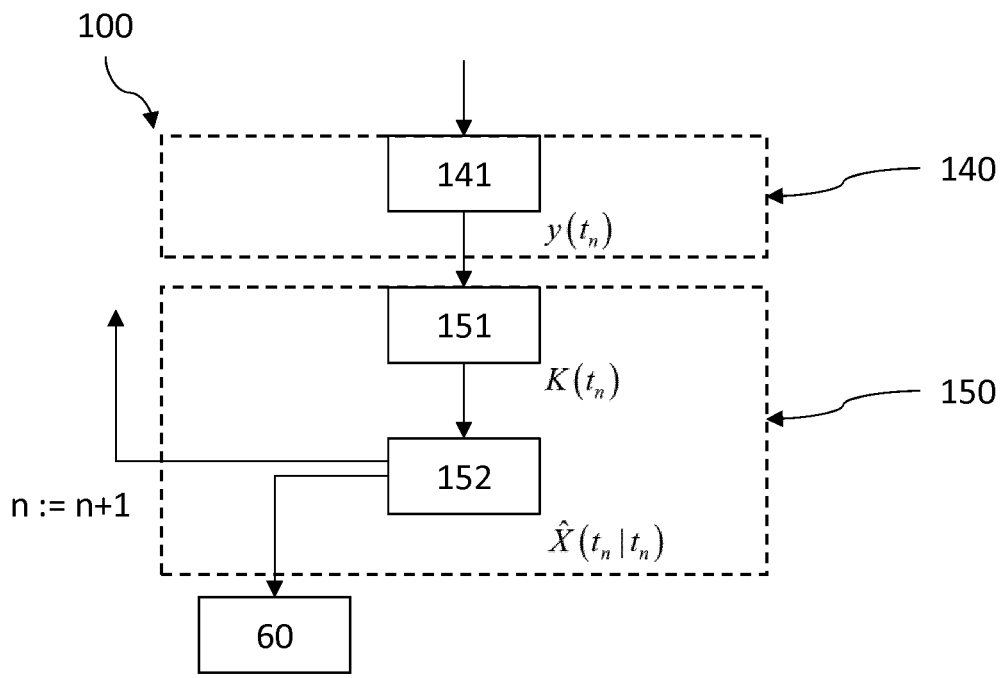
FIGS. 6A and 6B, respectively, illustrate a part of a flow diagram of a method for estimating a position of the magnet according to a variant of the first embodiment, and the phase of identification of the magnetic disrupter.
Figure 6B:
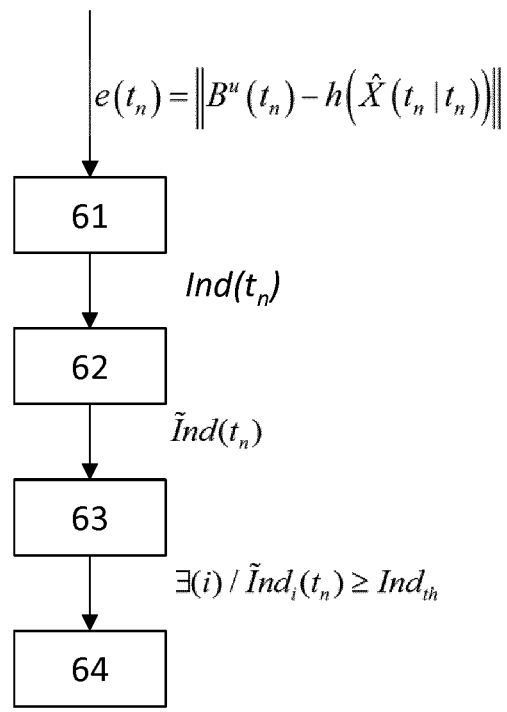

FIGS. 6A and 6B each illustrate a flow diagram partially representing a tracking method according to a variant of the first embodiment. The estimation algorithm implemented is also a Bayesian filtering, and more particularly here a Kalman filter.

In this variant, the different phases 110 (initialization), 120 (measurement), 130 (calculation of the estimated magnetic field), 140 (calculation of the bias, namely here the innovation), and 150 (calculation of the estimated position of the magnet) of the tracking method 100 are identical or similar to those described with reference to FIG. 3 and are not repeated here.

The method 100 according to this variant is distinguished from that described previously essentially in that the phase 60 of identification of the magnetic disrupter is no longer performed from the innovation term, and therefore from the predicted state vector $\hat{X}(t_n|t_{n-1})$, but from the updated state vector $\hat{X}(t_n|t_n)$. Thus, the phase 60 is performed following the step 152.

As FIG. 6B illustrates, in the step 61, the indicator term $\text{Ind}(t_n)$ is calculated at the current instant $t_n$ as being equal to the ratio between the deviation term $e(t_n)$ to an estimation of the estimated magnetic field $h(\hat{X})$. In this example, the deviation term $e(t_n)$ is not therefore equal to the innovation $y(t_n)$ obtained in the step 141, nor is it equal to the estimated magnetic field $h(\hat{X}(t_n|t_{n-1}))$ obtained in the step 132. On the contrary, the estimation term present in the deviation term $e(t_n)$ and present on the denominator correspond to the updated state vector $\hat{X}(t_n|t_n)$. Thus, the indicator term $\text{Ind}(t_n)$ can here be calculated from the following relationship, here with the predetermined constant c representative of the bias of at least one sensor:

$$Ind_i(t_n) = \frac{e_i(t_n)}{\|h_i(\hat{X})\| + c} = \frac{\|B_i^u(t_n) - h_i(\hat{X}(t_n|t_n))\|}{\|h_i(\hat{X}(t_n|t_n))\| + c}$$

Thus, the identification of the magnetic disrupter is made more accurate in as much as the indicator is calculated from the updated state vector and not from the predicted state vector. The deviation parameter $e(t_n)$ does not differ from the innovation $y(t_n)$ essentially by the state vector $\hat{X}$ considered. The observation function h is the same and the useful magnetic field $B^u$ is also.

As previously, the phase 60 of identification of the magnetic disrupter comprises the step 63 of comparison of the value or values of the indicator to a predetermined threshold value. It can also comprise the low-pass filtering step 62 in order to reduce the influence of the kinematics possibly present between two successive state vectors. It can also comprise a step of clipping or of weighting of the strong values of the indicator, notably when these values express a saturation of the measurement from the magnetometers concerned.

Figure 7:
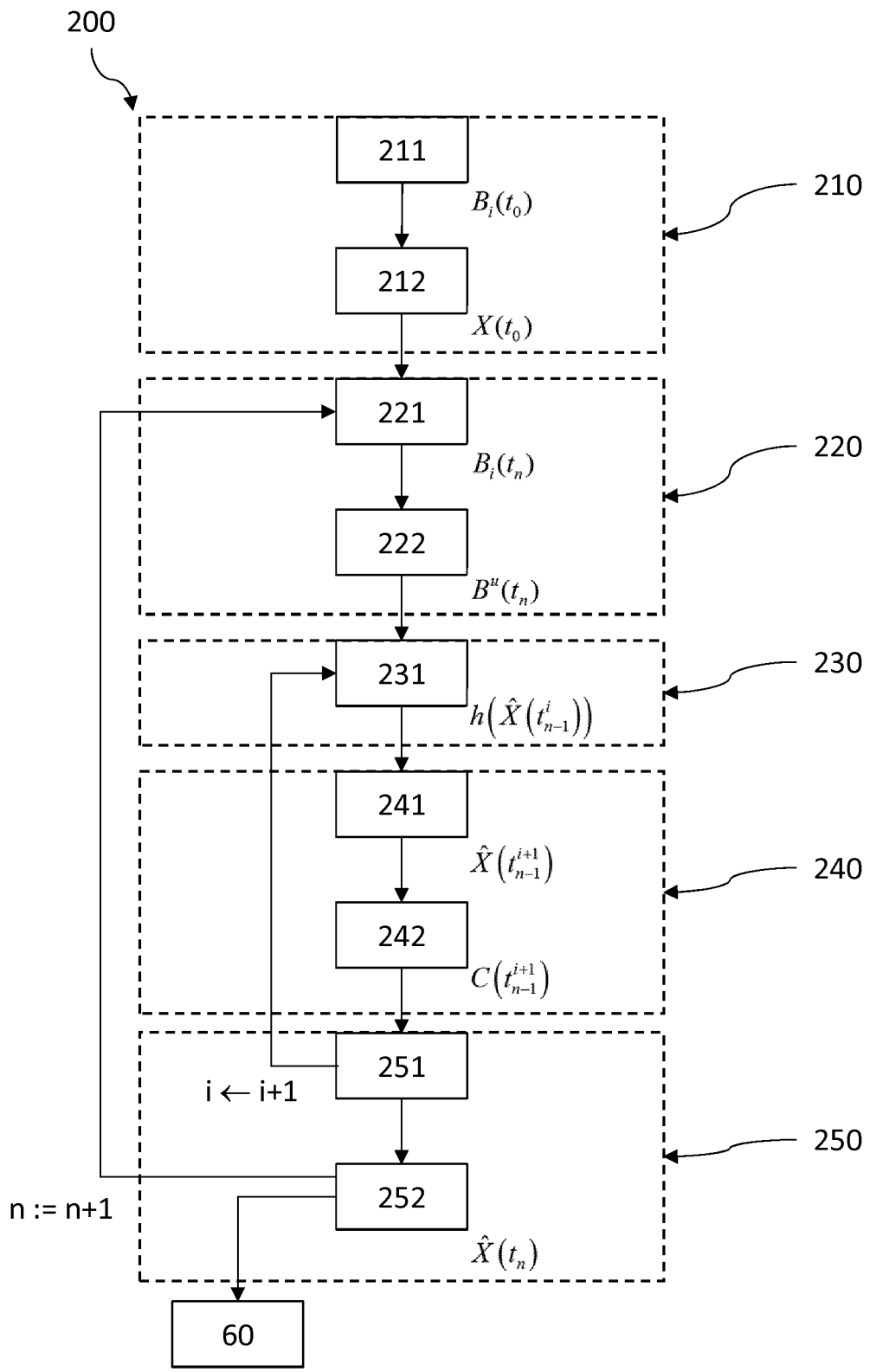
FIGS. 7 and 8, respectively, illustrate a flow diagram of a method for estimating a position of the magnet according to a second embodiment, in which the estimator is an optimization algorithm based on minimization of a cost function, and the phase of identification of the magnetic disrupter.
Figure 8:
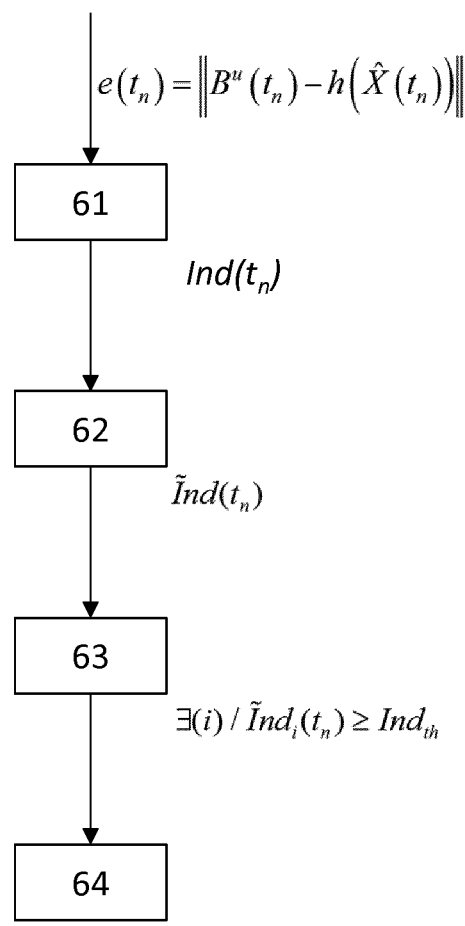

FIGS. 7 and 8 each illustrate a flow diagram partially representing a tracking method 200 according to a second embodiment. The estimation algorithm implemented is then an optimization, notably by minimization of a cost function, here by a gradient descent.

The method 200 comprises an initialization phase 210 and a phase 220 of measurement of the magnetic field $B_i(t_n)$ and of calculation of the useful magnetic field $B^u(t_n)$. These phases are identical or similar to those described previously and are not detailed here.

It also comprises several phases 230, 240, 250 performed in succession, for one and the same measurement time $t_n$, in an iterative loop of minimization of a cost function C. The state vector $\hat{X}(t_n)$ at the measurement instant $t_n$ is thus obtained by successive correction, following the increment i, of the state vector $\hat{X}(t_{n-1})$ of the preceding measurement instant $t_{n-1}$. It thus comprises a phase 230 of estimation of the magnetic field generated as a function of a state vector obtained previously, a phase 240 of calculation of a bias, here a cost function C, and a phase 250 of calculation of the estimated position of the magnet at the current instant $t_n$.

The phase 230 of estimation of the magnetic field $h(\hat{X})$ generated for a state vector obtained previously is similar to the phases 130 described previously. At the measurement instant $t_n$, it concerns the state vector obtained in the phase 250 at the preceding measurement instant $t_{n-1}$ or the state vector $\hat{X}(t_0)$ defined in the initialization at the instant $t_0$, possibly corrected as a function of the increment i of the iterative correction of minimization of a cost function C. The measurement instant $t_{n-1}$ at the increment i is thus denoted $t_{n-1}^i$.

Thus, in a step 231, there is calculated, at the current instant $t_n$, the estimated magnetic field $h(\hat{X}(t_{n-1}^i))$ corresponding to the state vector $\hat{X}(t_{n-1}^i)$ obtained previously at the measurement instant $t_{n-1}$, possibly corrected as a function of the increment i. When the increment i is equal to 1, the correction loop has not yet made a ground and the state vector $\hat{X}(t_{n-1}^1)$ is that $\hat{X}(t_{n-1})$ calculated in the step 252 of the phase 250. When the increment i is greater than 1, the correction loop has already made a round and the state vector differs from that $\hat{X}(t_{n-1})$ calculated in step 252 by at least one correction term. As detailed previously, the estimated magnetic field $h(\hat{X})$ is calculated from the observation function h, also called measurement function.

The phase 240 of calculation of the bias, here the cost function C to be minimized, comprises a step 241 of correction of the state vector, followed by a step of calculation of the cost function C.

In the step 241, the state vector is corrected at the preceding increment according, in this example, to a relationship corresponding to a gradient descent algorithm:

$$\hat{X}(t_{n-1}^{i+1}) = \hat{X}(t_{n-1}^i) - \mu \cdot \nabla_X \left[ C(\hat{X}(t_{n-1}^i)) \right]$$
$$= \hat{X}(t_{n-1}^i) - \mu \cdot \nabla_X \left[ f(h(\hat{X}) - B^u(t_n)) \right]$$

in which μ is the step whose value, positive, can depend on the increment i, ∇x is the gradient operator as a function of the variables of the state vector, and $C(\hat{X})$ is the cost function to be minimized, which depends on the difference between an estimated magnetic field $h(\hat{X})$ with respect to the useful measured magnetic field $B^u$. As an illustration, the preceding relationship can be written here in the least squares case, with $C(\hat{X}) = \|h(\hat{X}) - B^u\|^2$:

$$\hat{X}(t_{n-1}^{i+1}) = \hat{X}(t_{n-1}^i) - \mu \cdot \nabla_X \left[ C(\hat{X}(t_{n-1}^i)) \right]$$
$$= \hat{X}(t_{n-1}^i) - 2\mu \cdot H^T(\hat{X}(t_{n-1}^i)) \cdot (h(\hat{X}(t_{n-1}^i)) - B^u(t_n))$$

in which $H^T$ is the transpose of the jacobian of the observation function h applied to the state vector at the measurement instant $t_{n-1}$ and at the increment i. Other expressions are of course possible, for example, in the context of a Gauss-Newton or Levenberg-Marquardt method.

In the step 242, the norm $\|C\|$ of the cost function C is calculated. Several expressions are possible, for example, $\|h(\hat{X}) - B^u(t_n)^2\|$.

The phase 250 of calculation of the estimated position, at the current instant $t_n$, comprises a step 251 in which the norm $\|C\|$ is compared to a threshold. When $\|C\|$ is greater than the threshold, the increment i is increased by one iteration, and the minimization loop restarts from the step 231 applied to the corrected state vector. When $\|C\|$ is less than or equal to the threshold, there is then obtained, in the step 252, the value of the estimated state vector $\hat{X}(t_n)$ for the current instant $t_n$, which takes the value of the corrected state vector $\hat{X}(t_{n-1}^{i+1})$. The time is then incremented by a supplementary increment, and the method reiterates the steps previously described at the next current instant $t_{n+1}$, here from the measurement phase 220. The tracking of the magnet within the reference frame XYZ is thus performed.

The tracking method 200 also comprises the phase 60 of identification of the magnetic disrupter, the latter being performed from the estimated state vector $\hat{X}(t_n)$ for the current instant $t_n$, obtained in the step 252. It is similar to that described with reference to FIG. 6B.

In the step 61, the indicator term $\text{Ind}(t_n)$ is calculated at the current instant $t_n$ as being equal to the ratio between the deviation term $e(t_n)$ to an estimation of the estimated magnetic field $h(\hat{X})$. In this example, the deviation term $e(t_n)$ is equal to the norm of the difference between the magnetic field $h(\hat{X}(t_n))$ estimated for the state vector $\hat{X}(t_n)$ obtained in the step 252, and the measured magnetic field $B^u(t_n)$. Thus, the indicator $\text{Ind}(t_n)$ can be written, here with the predetermined constant c of the denominator, and for each sensor i:

$$\text{Ind}_i(t_n) = \frac{e_i(t_n)}{\|h_i(\hat{X}(t_n))\| + c} = \frac{\|B_i^u(t_n) - h_i(\hat{X}(t_n))\|}{\|h_i(\hat{X}(t_n))\| + c}$$

Thus, the deviation parameter $e(t_n)$ differs from the bias, here the cost function C, essentially by the state vector $\hat{X}$ considered. The observation function h is the same and the useful magnetic field $B^u$ is also.

As a variant, as mentioned previously, the indicator can comprise, on the denominator, the measured magnetic field $B^u$ with or without the predetermined constant c, even just the predetermined constant c.

As previously, the phase 60 of identification of the magnetic disrupter comprises the step 63 of comparison of the value or values of the indicator to a predetermined threshold value. It can also comprise the low-pass filtering step 62 in order to reduce the influence of the kinematics present possibly between two successive state vectors. It can also comprise a step of clipping or of weighting of the strong values of the indicator, notably when these values express a saturation of the measurement of the magnetometers concerned.

Particular embodiments have just been described. Different variants and modifications will become apparent to the person skilled in the art.

The invention claimed is:

1. A method for estimating the position of a magnet by a tracking device comprising an array of magnetometers capable of measuring a magnetic field, the method being implemented by a processor, comprising the following phases:
    determination of an initial state vector associated with the magnet, for an initial measurement instant, the state vector comprising variables representative of the position of the magnet relative to the array of magnetometers;
    measurement by the array of magnetometers of a useful magnetic field, at a measurement instant, in the presence of the magnet;
    estimation of a magnetic field generated by the magnet, as a function of the state vector obtained at a preceding measurement instant, on a basis of a predetermined model expressing a relationship between the magnetic field generated by the magnet and the state vector of the magnet;
    calculation of a bias by a difference between the estimated magnetic field and the measured useful magnetic field;
    updating of the state vector as a function of the calculated bias, thus making it possible to obtain an estimated position of the magnet at the measurement instant;
    reiteration of the measurement, estimation, bias calculation and updating phases, on the basis of the updated state vector, by incrementing the measurement instant;
    wherein the method also comprises the following phase:
    identification, at at least one measurement instant, of a magnetic disrupter distinct from the magnet and situated in a vicinity of the array of magnetometers, comprising the following steps:
        calculation of an indicator parameter from a deviation parameter defined as a function of a difference between an estimated magnetic field generated by the magnet for the state vector obtained at the preceding measurement instant or for the updated state vector, on the basis of the predetermined model, and the useful magnetic field measured at the measurement instant; and
        comparison of the indicator to a predetermined threshold value, and identification of the magnetic disrupter when at least one of the values of the indicator is greater than or equal to the threshold value; and
    wherein the indicator is equal to a ratio of the deviation parameter to a denominator term comprising at least the estimated magnetic field of the indicator, the measured useful magnetic field of the indicator, or at least one predetermined constant representative of a bias of at least one of the magnetometers.

2. The method of claim 1, wherein the denominator term comprises the estimated magnetic field of the indicator and the predetermined constant.

3. The method of claim 1, wherein the estimation, bias calculation and updating phases are performed by an optimization algorithm based on iterative minimization bias, called cost function, at the measurement instant.

4. The method of claim 1, wherein the state vector also comprises variables representative of a magnetic moment of the magnet.

5. An information storage medium, comprising instructions for implementing the method as claimed in claim 1, these instructions being executable by a processor.

6. A method for estimating the position of a magnet by a tracking device comprising an array of magnetometers capable of measuring a magnetic field, the method being implemented by a processor, comprising the following phases:
    determination of an initial state vector associated with the magnet, for an initial measurement instant, the state vector comprising variables representative of the position of the magnet relative to the array of magnetometers;
    measurement by the array of magnetometers of a useful magnetic field, at a measurement instant, in the presence of the magnet;
    estimation of a magnetic field generated by the magnet, as a function of the state vector obtained at a preceding measurement instant, on a basis of a predetermined model expressing a relationship between the magnetic field generated by the magnet and the state vector of the magnet;
    calculation of a bias by a difference between the estimated magnetic field and the measured useful magnetic field;
    updating of the state vector as a function of the calculated bias, thus making it possible to obtain an estimated position of the magnet at the measurement instant;
    reiteration of the measurement, estimation, bias calculation and updating phases, on the basis of the updated state vector, by incrementing the measurement instant;
    wherein the method also comprises the following phase:
    identification, at at least one measurement instant, of a magnetic disrupter distinct from the magnet and situated in a vicinity of the array of magnetometers, comprising the following steps:
        calculation of an indicator parameter from a deviation parameter defined as a function of a difference between an estimated magnetic field generated by the magnet for the state vector obtained at the preceding measurement instant or for the updated state vector, on the basis of the predetermined model, and the useful magnetic field measured at the measurement instant; and
        comparison of the indicator to a predetermined threshold value, and identification of the magnetic disrupter when at least one of the values of the indicator is greater than or equal to the threshold value,
    wherein the estimation, bias calculation and updating phases are performed by a Bayesian recursive estimation algorithm;
    wherein the estimation phase comprises:
        a step of obtaining of a predicted state vector at the measurement instant as a function of a state vector obtained at a preceding measurement instant, and
        a step of calculation of the estimated magnetic field for the predicted state vector; and
    wherein the phase of bias calculation comprises:
        a step of calculation of the bias, called innovation, as the difference between the estimated magnetic field for the predicted state vector and the measured useful magnetic field.

7. The method of claim 6, wherein the deviation parameter is equal to the innovation.

8. The method of claim 6, wherein the deviation parameter is equal to the difference between an estimated magnetic field generated by the magnet for the updated state vector, and the useful magnetic field measured at the measurement instant.

9. A method for estimating the position of a magnet by a tracking device comprising an array of magnetometers capable of measuring a magnetic field, the method being implemented by a processor, comprising the following phases:
- determination of an initial state vector associated with the magnet, for an initial measurement instant, the state vector comprising variables representative of the position of the magnet relative to the array of magnetometers;
- measurement by the array of magnetometers of a useful magnetic field, at a measurement instant, in the presence of the magnet;
- estimation of a magnetic field generated by the magnet, as a function of the state vector obtained at a preceding measurement instant, on a basis of a predetermined model expressing a relationship between the magnetic field generated by the magnet and the state vector of the magnet;
- calculation of a bias by a difference between the estimated magnetic field and the measured useful magnetic field;
- updating of the state vector as a function of the calculated bias, thus making it possible to obtain an estimated position of the magnet at the measurement instant;
- reiteration of the measurement, estimation, bias calculation and updating phases, on the basis of the updated state vector, by incrementing the measurement instant;

wherein the method also comprises the following phase:
- identification, at at least one measurement instant, of a magnetic disrupter distinct from the magnet and situated in a vicinity of the array of magnetometers, comprising the following steps:
  - calculation of an indicator parameter from a deviation parameter defined as a function of a difference between an estimated magnetic field generated by the magnet for the state vector obtained at the preceding measurement instant or for the updated state vector, on the basis of the predetermined model, and the useful magnetic field measured at the measurement instant; and
  - comparison of the indicator to a predetermined threshold value, and identification of the magnetic disrupter when at least one of the values of the indicator is greater than or equal to the threshold value; and wherein the phase of identification of the magnetic disrupter comprises a step of transmission of a signal to a user prompting separation of the magnetic disrupter from the array of magnetometers, as long as the indicator is greater than the predetermined threshold value.

* * * * *

UNITED STATES PATENT AND TRADEMARK OFFICE
CERTIFICATE OF CORRECTION

PATENT NO. : 11,262,216 B2
APPLICATION NO. : 16/617981
DATED : March 1, 2022
INVENTOR(S) : Dupre la Tour et al.

It is certified that error appears in the above-identified patent and that said Letters Patent is hereby corrected as shown below:

In the Specification

| | | |
|---|---|---|
| Column 3, | Lines 61-62, | change ""of" the order of mean" to --"of the order of" mean-- |
| Column 4, | Lines 62-63, | change "magnetometers n," to --magnetometers $M_i$,-- |
| Column 5, | Line 4, | change "Magnetometers n" to --Magnetometers $M_i$-- |
| Column 5, | Line 14, | change "magnetometers N1" to --magnetometers $M_i$-- |
| Column 5, | Line 18, | change "magnetometer NI" to --magnetometer $M_i$-- |
| Column 5, | Line 21, | change "magnetometers NI" to --magnetometers $M_i$-- |
| Column 5, | Line 33, | change "magnetometers M." to --magnetometers $M_i$.-- |
| Column 5, | Line 37, | change "magnetometer NI" to --magnetometer $M_i$-- |
| Column 5, | Line 51, | change "magnetometers M." to --magnetometers $M_i$.-- |
| Column 5, | Line 61, | change "magnetometer n" to --magnetometer $M_i$-- |
| Column 6, | Line 14, | change "instant to." to --instant $t_0$.-- |
| Column 6, | Line 15, | change "instant to," to --instant $t_0$,-- |
| Column 6, | Line 16, | change "magnetometer n" to --magnetometer $M_i$-- |
| Column 7, | Line 20, | change "between to" to --between $t_0$-- |
| Column 9, | Line 47, | change "term y(t" to --term $y(t_n)$-- |
| Column 12, | Line 48, | change "at to" to --at $t_0$-- |
| Column 12, | Line 53, | change "at to" to --at $t_0$-- |
| Column 12, | Line 58, | change "at to" to --at $t_0$-- |

Signed and Sealed this
Nineteenth Day of July, 2022

*Katherine Kelly Vidal*

Katherine Kelly Vidal
*Director of the United States Patent and Trademark Office*